(No Model.)

E. STORM.
FIFTH WHEEL.

No. 390,042. Patented Sept. 25, 1888.

Witnesses
K. L. Brennan
Maurice J. Roach.

Inventor
Edward Storm
By his attorneys
Gifford & Brown

UNITED STATES PATENT OFFICE.

EDWARD STORM, OF POUGHKEEPSIE, NEW YORK.

FIFTH-WHEEL.

SPECIFICATION forming part of Letters Patent No. 390,042, dated September 25, 1888.

Application filed May 9, 1888. Serial No. 273,334. (No model.)

*To all whom it may concern:*

Be it known that I, EDWARD STORM, of Poughkeepsie, in the county of Dutchess and State of New York, have invented a certain new and useful Improvement in Fifth-Wheels, of which the following is a specification.

I will describe a fifth-wheel embodying my improvement, and then point out the novel features in the claims.

Figure 1:
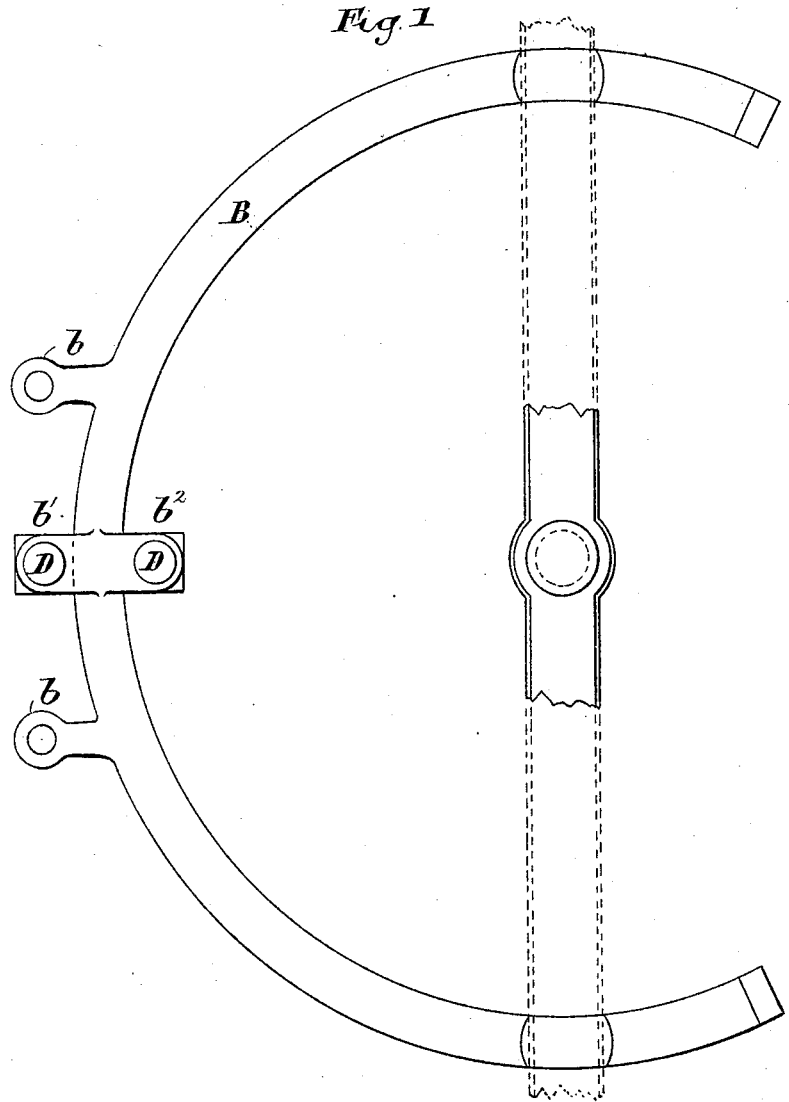
Figure 2:
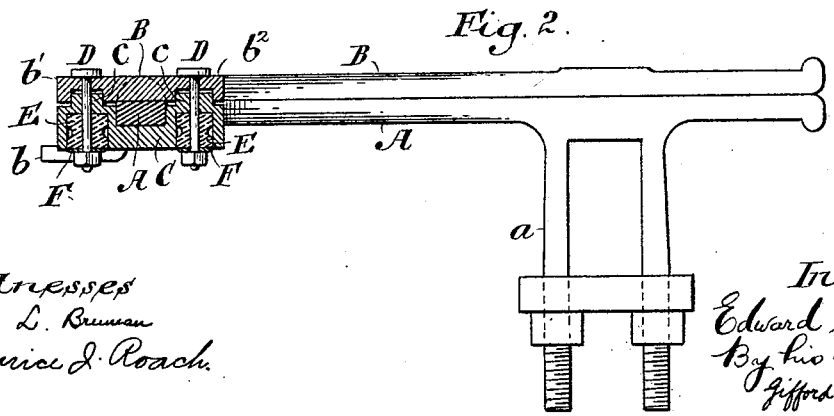

In the accompanying drawings, Figure 1 is a plan or top view of a fifth-wheel embodying my improvement. In this figure the front axle and the bolster or bed of a vehicle are in part represented. Fig. 2 is a transverse section of the fifth-wheel.

Similar letters of reference designate corresponding parts in both figures.

A B designate the two parts of the fifth-wheel. They are in the form of the segment of a circle, as here shown. They are maintained in sliding contact with one another. The lower part, A, has clips $a$, whereby it may be secured to the front axle of a vehicle. The upper part, B, is to be secured to the bolster or bed of the vehicle-body. I have shown this upper part as provided with lugs $b$, whereby it is adapted to be secured to a double reach. The upper part, B, is provided at about the middle of its length with lugs $b'$ $b^2$, that extend in opposite directions from it. These lugs may be made integral with the part B. Below the lower part, A, a yoke or plate, C, extends in line with the lugs $b'$ $b^2$ of the part B. This yoke or plate C has its end portions extended upwardly at each side of the lower part, A, of the fifth-wheel. The upwardly-extending portions at each side of the lower part, A, of the fifth-wheel are shown as having at the upper extremity tongue-like portions $c$, which enter recesses in the under side of the lugs $b'$ $b^2$ of the upper part, B, of the fifth-wheel. By reason of the tongue-like portions $c$, the yoke C is prevented from moving transversely to the two parts of the fifth-wheel. The upward extension of the end portions of the yoke serve as guides, whereby the two parts of the fifth-wheel will be caused to work in line when the forward axle of the vehicle, to which the fifth-wheel is applied, shall be turned.

Bolts D extend through the lugs $b'$ $b^2$ of the upper part, B, of the fifth-wheel, also through the tongue-like portions $c$ of the yoke C, and right through the end portions of the yoke. As shown, the heads of the bolts D are above the lugs $b'$ $b^2$ of the part B of the fifth-wheel, and nuts are applied to the lower ends of the bolts, below the yoke C.

The yoke is combined with two springs, against which the bolts act. As here shown, these springs consist of blocks of india-rubber, E, and are arranged in cavities, with which the end portions of the yoke are provided. The nuts of the bolts are shown as acting upon the springs, but have interposed between them and the springs washers F.

The blocks of rubber are shown as made with a circumferential groove about midway between the ends, so as to afford them provision for yielding in the cavities.

The two parts of this fifth-wheel will be effectively guided by the construction of yoke which I have set forth, and will be held in contact with a yielding pressure. Moreover it will have no parts apt to become filled with dirt.

What I claim as my invention, and desire to secure by Letters Patent, is—

1. In a fifth-wheel, the combination of two circular parts fitted together face to face, lugs extending transversely from the upper of the two parts, a yoke extending beneath the lower of the two parts and having end portions extending upwardly one on each side of the lower of the said two parts, and embracing the same so as to form guides, bolts extending through the lugs of the upper part and through the end portions of the yoke, and springs having bearings against the yoke and bolts, substantially as specified.

2. In a fifth-wheel, the combination of two circular parts fitted together face to face, lugs extending transversely from the upper of the two parts, a yoke extending beneath the lower of the two parts and having end portions extending upwardly one on each side of the lower of the said two parts, and embracing the same so as to form guides, tongue-like portions extending from the yoke into the lugs, bolts extending through the lugs of the upper part and through the end portions of the yoke, and springs having bearings against the yoke and bolts, substantially as specified.

EDWARD STORM.

Witnesses:
HENRY F. LOSEY,
CHARLES B. HERRICK.